United States Patent Office 2,813,910
Patented Nov. 19, 1957

2,813,910

REMOVAL OF FORMIC ACID CATALYST FROM HYDROXYLATION PRODUCTS OF ETHYLENIC ALCOHOLS

Jacobus Jan Tjepkema, Amsterdam, Netherlands, assignor to Shell Development Company, New York, N. Y., a corporation of Delaware No Drawing. Application May 13, 1955, Serial No. 508,300

Claims priority, application Netherlands May 20, 1954

3 Claims. (Cl. 260—635)

This invention relates to the production of polyols containing at least three hydroxyl groups per molecule by hydroxylating ethylenic alcohols in the presence of formic acid. It deals with an improved method for removing formic acid from the aqueous reaction products. The invention also deals with a new method for carrying out hydroxylation reactions of this type.

Hydroxylation of ethylenic compounds by reaction with a peroxide in the presence of formic acid is a well known reaction which has been used to produce various polyols. This type of reaction is described, for instance, by Swern et al. in the Journal of the American Chemical Society, vol. 67, pages 1786–9 (1945), and vol. 68, pages 1504–7 (1946), English et al., vol. 69, pages 2120–22 (1947), U. S. Patent 2,492,201 and Greenspan, Industrial and Engineering Chemistry, vol. 39, pages 847–8 (1947). The hydroxylation of ethylenic alcohols in this way is claimed by Bergsteinsson et al. in U. S. Patent 2,500,599. When the reaction is carried out with only small amounts of water present, formate esters of the polyol are the chief products of the reaction and only a part of the formic acid can be recovered directly by distillation. Where the free hydroxy compounds are the desired products it has been proposed to hydrolyze these formates with aqueous base or by steam treatment. This method of operation results, however, in the recovery of the formic acid as a very dilute aqueous solution which must be reconcentrated at considerable added cost. In U. S. Patent 2,500,599 it has also been suggested that the product be freed of esters by ester exchange, that is, a conversion in which the alcohol radical in the ester is replaced by a different alcohol radical. This not only involves the introduction of another alcohol into the system but also has the disadvantage that the formic acid is recovered in an esterified form which cannot be reused in the process without hydrolysis.

The Bergsteinsson et al. patent points out that a larger proportion of free hydroxy product and less ester can be produced by carrying out the reaction in dilute aqueous solution. But as described in U. S. Patent 2,555,927 the formic acid is not recovered in pure form on distillation of the mixture, but distills as a binary azeotrope containing about 30% of water and boiling at about 108° C. As a result of the prolonged contact of polyol with 70% formic acid during the distillation considerable esterification takes place. The product consequently is a mixture of free polyol with a not inconsiderable quantity of its formate ester. To obtain pure free polyol, therefore, these esters must be converted as previously described with consequent added cost of operation.

It is an object of the present invention to provide a process for producing polyols which avoids the disadvantages of the prior methods of operation. Another object is the provision of a method for removing formic acid from hydroxylation products in a more economical manner. Still another object is to recover the formic acid from hydroxylation mixtures in a form suitable for direct return to the hydroxylation reaction. A further object is to hydroxylate ethylenic alcohols while supplying catalyst for the reaction as formic acid ester of the ethylenic alcohol being hydroxylated. Still other objects and advantages of the invention will be apparent from the following description of the new method and some of its many applications.

In accordance with the invention formic acid is removed from the aqueous products of hydroxylating an ethylenic alcohol in the presence of formic acid by heating the aqueous mixture with a stoichiometric excess of ethylenic alcohol based upon the amount of free and combined formic acid present whereby the formate ester of said ethylenic alcohol is produced and separated from the polyhydroxy alcohol which is the desired product of the reaction. This method of removing the formic acid has the advantage of avoiding formation of the formic acid-water azeotrope and of eliminating esterification of the desired polyol by formic acid during the formic acid removal.

It has been found that the formic acid ester of the starting ethylenic alcohol which is obtained in this way can be fed directly to the hydroxylation step of the process and used to supply formic acid catalyst therefor. Thus it was discovered that in an aqueous solution under hydroxylating conditions there is a rapid partial splitting of the ester into the unsaturated alcohol and formic acid. As a result hydroxylation of the ethylenic alcohol thus set free takes place under the catalytic influence of the formic acid simultaneously formed. No separate hydrolysis of formate esters of any type is needed and the production of dilute aqueous formic acid accompanying such hydrolysis is avoided.

The process is especially advantageous for the removal of formic acid from aqueous solutions of polyols having three to four carbon atoms per molecule such as are obtained by hydroxylating the corresponding ethylenic alcohols in an aqueous medium and in the presence of formic acid. Also any suitable hydroxylating agent can be employed. Preferably peroxide hydroxylating agents are used. These can be any of the organic or inorganic peroxides known to be effective. A number of such suitable peroxides are described in U. S. Patent 2,500,599, for example. Hydrogen peroxide is the preferred hydroxylating agent for use in the process, however, because it not only gives excellent yields but also does not introduce by-products which complicate the recovery and purification of the polyol.

The quantity of hydrogen peroxide required for hydroxylation is, of course, equimolar to the quantity of ethylenic alcohol to be converted which may be added either in the form of the formate or as the free alcohol. It is, of course, less attractive economically to add such a large excess of peroxide with respect to the total quantities of ethylenic formate and ethylenic alcohol that a substantial part of the peroxide remains unreacted after the hydroxylation step of the process. Such unreacted peroxide is generally not recoverable and should be made inactive before carrying out the subsequent distillation in the presence of free ethylenic alcohol according to the invention. This means a loss of peroxide. Particularly favorable are hydrogen peroxide concentrations in the reaction mixture ranging from 1 to 20% by weight, concentrations between 2 and 10% by weight being preferred. With the use of lower concentrations the reaction proceeds too slowly and the polyol solution obtained is too highly diluted. If the concentration in the reaction mixture is greater than 20% by weight, there is too great a formation of by-products. in addition, concentrated solutions are obtained from which the formic acid is more difficult to recover.

Usually it is desirable to limit the amount of free ethylenic alcohol present during hydroxylation to not more than about a four-fold molecular excess with respect to the ethylenic alcohol formate which is present in the mixture. This amount is sufficient for carrying out the distillation according to the invention without addition of further amounts of free ethylenic alcohol. The hydroxylation can, however, be carried out without addition of free ethylenic alcohol. But since such free alcohol is generally added in the subsequent step of the process it is usually convenient to add it to the reaction mixture either at the beginning of the hydroxylation or at a later stage. Although usually not an advantage, if desired formic acid can be present in excess with respect to ethylenic alcohol during hydroxylation. It is thus feasible, for example, to hydroxylate allyl formate to glycerol formate in the presence of free formic acid. After completion of the reaction a large quantity of allyl alcohol must then, of course, be added before carrying out the next step of the process.

The hydroxylation is carried out in the liquid phase, using temperatures of about 0° C. or higher. Hydroxylation can be advantageously accelerated by using temperatures above room temperature, preferably temperatures between about 50° C. and 100° C. The time of reaction will vary depending upon the conditions used and is generally carried on until the desired conversion of peroxide as shown by analysis of a withdrawn sample has been attained. Batch, intermittent or continuous methods of operation can be successfully employed.

In the second step of the process formic acid, free and combined, in the hydroxylation mixture is reacted with the ethylenic alcohol which is being hydroxylated to produce the formate ester of such alcohol and the ester thus produced is distilled to separate it from the polyol which is the desired product of the process. These operations of forming the formate of the starting ethylenic alcohol and removing it from the polyol can advantageously be carried out simultaneously when using the preferred starting ethylenic alcohols which form formic acid esters having boiling points lower than that of the formic acid-water azeotrope (108° C. at atmospheric pressure) particularly the ethylenic alcohols having not more than four carbon atoms per molecule. In other cases it may be desirable to carry out the esterification and ester exchange reactions and subsequently distill to separate the formate ester of the starting ethylenic alcohol from the polyol product. The ester exchange of polyol formate to formate of the ethylenic alcohol and esterification of free formic acid with ethylenic alcohol can be promoted, if desired, by adding a small amount of a strong inorganic acid such, for instance, as sulfuric or phosphoric acid. This acid can be added during or before the hydroxylation or may be introduced after the hydroxylation step is completed.

As previously pointed out, it is desirable to have present during the esterification and ester exchange reactions an excess of the ethylenic alcohol which is being hydroxylated. This method of operation favors more complete conversion of the free and combined formic acid to ethylenic alcohol ester. Advantageously between about 1½ and about 3 moles of ethylenic alcohol are used per mole of formic acid, free and combined, in the hydroxylation mixture being treated. The esterification and distillation can be conducted at atmospheric pressure but increased pressures are advantageous in these operations.

The process of the invention is particularly suitable for the production of glycerol by hydroxylating allyl alcohol. In this case allyl formate is obtained during the distillation with excess allyl alcohol which follows the hydroxylation step. When this distillation is carried out at atmospheric pressure two azeotropes are obtained successfully, viz. first a ternary azeotrope boiling at about 72° C., consisting of approximately 80% by weight of allyl formate, 5% by weight of water and 15% by weight of allyl alcohol, and subsequently a binary azeotrope boiling at about 89° C., approximately consisting of 72% by weight of allyl alcohol and 28% by weight of water.

In a discontinuous embodiment of the process according to the invention, the allyl formate thus obtained with or without the allyl alcohol separately recovered, is contacted with an aqueous solution of hydrogen peroxide under hydroxylating conditions. The heterogeneous mixture thus obtained soon becomes homogeneous as a result of partial hydrolysis of allyl formate, while the peroxide concentration gradually decreases. If required, the necessary peroxide need not all be added to the reaction mixture at once, but a part of it may afterwards be added continuously or intermittently during the course of the reaction. The required excess of allyl alcohol is added at a suitable time before, during or after, preferably after hydroxylation and the mixture obtained is finally distilled in the manner described above. If desired, from the residue obtained in the distillation according to the invention and which consists of a solution of glycerol in water the glycerol may be recovered, for example, in a known manner by first neutralizing and then distilling.

The process of the invention can be carried out in the same way with particularly good results for the preparation of 2-methyl glycerol from methallyl alcohol or 1-methyl glycerol from crotyl alcohol or methyl vinyl carbinol.

The invention may be further illustrated by the following non-limitative examples.

*Example I*

A mixture of 368 grams of glycerol, 400 grams of water, 184 grams of formic acid and 364 grams of allyl alcohol was distilled until the boiling point of water was reached. 88 mole percent of the quantity of formic acid originally present was recovered in the distillate as allyl formate. This experiment showed in principle that practically all the formic acid, either present in free form or bound as glycerol formate can be recovered as allyl formate from the reaction mixture of the first stage.

*Example II*

Two moles of allyl formate together with 1 mole of hydrogen peroxide (added as a 30% solution) were kept at boiling temperature (bottom temperature 79° C.) for 4 hours while stirring in a round-bottomed flask, provided with a reflux cooler. After only 15 minutes the originally heterogeneous system became homogeneous, and after 4 hours all the hydrogen peroxide was consumed. 1.33 moles of allyl alcohol and 2.5 milliliters of 36% hydrogen chloride were then added, after which the re-formed and unconverted allyl formate was first removed by distillation in the form of a ternary azeotrope with allyl alcohol and water (boiling point about 72° C.) and afterwards the binary azeotrope, allyl alcohol-water (boiling point about 89° C.) was passed over. The residue consisted of an approximately 50% aqueous solution of glycerol from which glycerol was obtained by distillation after neutralization with sodium hydroxide. The yield of distilled glycerol, calculated on allyl groups, was 62.5 mole percent and 42.5 mole percent, calculated on hydrogen peroxide. In this distillation a residue remained which probably consisted of polyglycerols.

*Example III*

In the same manner as described in Example II 2 moles of allyl formate were heated this time with 2.2 moles of hydrogen peroxide (added as a 30% solution). The bottom temperature varied in this case from about 50° C. to about 60° C., the reaction time being about 10 hours. All the added hydrogen peroxide was then converted, partly in that it was decomposed to form water and oxygen.

The quantity of allyl alcohol added after completion of the reaction amounted to 3 moles, the working up took place as in Example II. A yield of glycerol obtained by distillation of 60 mole percent was now found, calculated on the 2 moles of allyl formate originally present.

*Example IV*

A mixture consisting of 2 moles of allyl formate, 2 moles of allyl alcohol, 2 moles of hydrogen peroxide and 1400 milliliters of water was reacted for 14 hours at 80° C., after which 99 mole percent of the hydrogen peroxide was found to have been consumed. Two moles of allyl alcohol were then added to the reaction mixture which was distilled with the use of a suitable distillation column.

The product boiling below 100° C. contained 4.05 moles of olefinic compounds (allyl formate and allyl alcohol) and 1.82 moles of formic acid in free and esterified condition. This product can be recycled so that it was only necessary to add a small quantity of formic acid in order to be able to continue the hydroxylation process.

The remaining aqueous solution contained approximately 10% of glycerol. The following products were obtained from it by distillation:

| | Mole percent |
|---|---|
| Allyl glycerol ether | Less than 5 |
| Glycerol | 75–80 |
| Polyglycerol (residue) | 10–15 |

The yield percentages are in respect of the unrecovered quantity of allyl alcohol. The glycerol yield based on hydrogen peroxide is also 75 to 80%.

I claim as my invention:

1. In a process for producing an aliphatic trihydric alcohol of three to four carbon atoms per molecule by hydroxylating the corresponding monohydric, monoethylenic aliphatic alcohol by reaction with a peroxide in an aqueous medium under the catalytic influence of formic acid and removing formic acid from the product, the improvement which comprises heating the formic acid-containing reaction mixture in the presence of at least about 1½ moles of said ethylenic alcohol per mole of free and combined formic acid present whereby formate ester of said ethylenic alcohol is produced, distilling off said formate ester from the trihydric alcohol and feeding the formate ester of said ethylenic alcohol to the hydroxylation step of the process to provide ethylenic alcohol for hydroxylation therein.

2. In a process for producing glycerine by reacting allyl alcohol with hydrogen peroxide at between about 50° C. and 100° C. in an aqueous mixture wherein the concentration of hydrogen peroxide is from 1 to 20% by weight under the catalytic influence of formic acid and removing formic acid from the reaction product, the improvement which comprises adding allyl alcohol to the reacted mixture in an amount to make the allyl alcohol content thereof between about 1½ and about 3 moles per mole of free plus combined formic acid present, distilling the mixture to remove allyl alcohol and allyl formate therefrom as overhead product, returning said overhead product to said reaction with hydrogen peroxide and recovering glycerine as bottoms product.

3. A process in accordance with claim 2 wherein the distillation is carried out under superatmospheric pressure.

References Cited in the file of this patent

UNITED STATES PATENTS

| 2,500,599 | Bergsteinsson et al. | Mar. 14, 1950 |
| 2,545,182 | Whetstone et al. | Mar. 13, 1951 |
| 2,555,927 | Himel et al. | June 5, 1951 |

OTHER REFERENCES

Hackh's Chemical Dictionary, 3rd ed., Blakiston Co., Philadelphia, 1950, page 35.